United States Patent [19]
Aerni et al.

[11] Patent Number: 4,730,959
[45] Date of Patent: Mar. 15, 1988

[54] EDGE JOINING FIXTURE

[76] Inventors: Frank D. Aerni; Deborah J. Aerni, both of 4533 Colfax Cir., Lincoln, Nebr. 68504

[21] Appl. No.: 101,835

[22] Filed: Sep. 28, 1987

[51] Int. Cl.<sup>4</sup> ............................................. B23B 47/28
[52] U.S. Cl. .............................. 408/115 R; 408/72 R; 408/103
[58] Field of Search ...................... 144/93, 104, 144 R; 408/1, 3, 72, 103, 115 R, 115 B

[56] References Cited

U.S. PATENT DOCUMENTS

| | | | |
|---|---|---|---|
| 4,158,523 | 6/1979 | Schatzko | 408/115 R |
| 4,421,442 | 12/1983 | Linblad | 408/115 R |
| 4,443,138 | 4/1984 | Butera | 408/115 R |

FOREIGN PATENT DOCUMENTS 1314809  4/1973  United Kingdom ............ 408/115 R

*Primary Examiner*—W. Donald Bray
*Attorney, Agent, or Firm*—Zarley, McKee, Thomte, Voorhees & Sease

[57] ABSTRACT

An edge joining fixture is provided comprising a spacer which is secured to the ends of a pair of boards by a clamp with the ends of the board abutting the spacer so that the ends will be properly aligned. A body member having drill bit bushings formed therein is positioned between the board members and rests upon the upper edges of the board members and is then clamped into position. A drill bit is then moved downwardly through the bushings to create dowel holes in the edges of the boards. A clamp on the body member is then released and the body member moved to the next dowel hole location where the body member is again clamped into position. The procedure is repeated until all of the desired dowel holes have been formed.

3 Claims, 6 Drawing Figures

EDGE JOINING FIXTURE

BACKGROUND OF THE INVENTION

This invention relates to an edge joining fixture and more particularly to an edge joining fixture which enables the user to accurately locate dowel holes in the edges of two or more boards, of any width or length, that are to be glued edge-to-edge. Wood dowels, or dowels of any material may be inserted into the dowel holes.

During woodworking operations, it is some times necessary to glue the edges of two or more boards together to create a larger surface. Woodworkers frequently drill dowel holes in the edges of the boards and then insert dowels into the dowel holes to reinforce the glued joint holding the boards together. A problem associated with such a procedure is the precise location of the dowel holes so that the ends of the boards and the surfaces of the boards will be accurately aligned once the boards have been assembled in the edge-to-edge relationship.

It is therefore a principal object of the invention to provide an edge joining fixture.

A further object of the invention is to provide an edge joining fixture which provides a means for accurately aligning the faces of a plurality of boards so that only a minimum amount of material must be removed from the face of the boards to provide a smooth and uninterrupted surface thereon.

A further object of the invention is to provide an edge joining fixture which enables a user to accurately locate holes in the edges of two or more boards, of any width or length, that are to be glued edge-to-edge.

Yet another object of the invention is to provide an edge joining fixture which is convenient to use.

Yet another object of the invention is to provide an edge joining fixture which is relatively inexpensive and which may be used in conjunction with other tools normally owned by the user.

Still another object of the invention is to provide an edge joining fixture which may also be used to create miter joints.

Still another object of the invention is to provide an edge joining fixture which is durable in use and refined in appearance.

These and other objects will be apparent to those skilled in the art.

SUMMARY OF THE INVENTION

Figure 1:
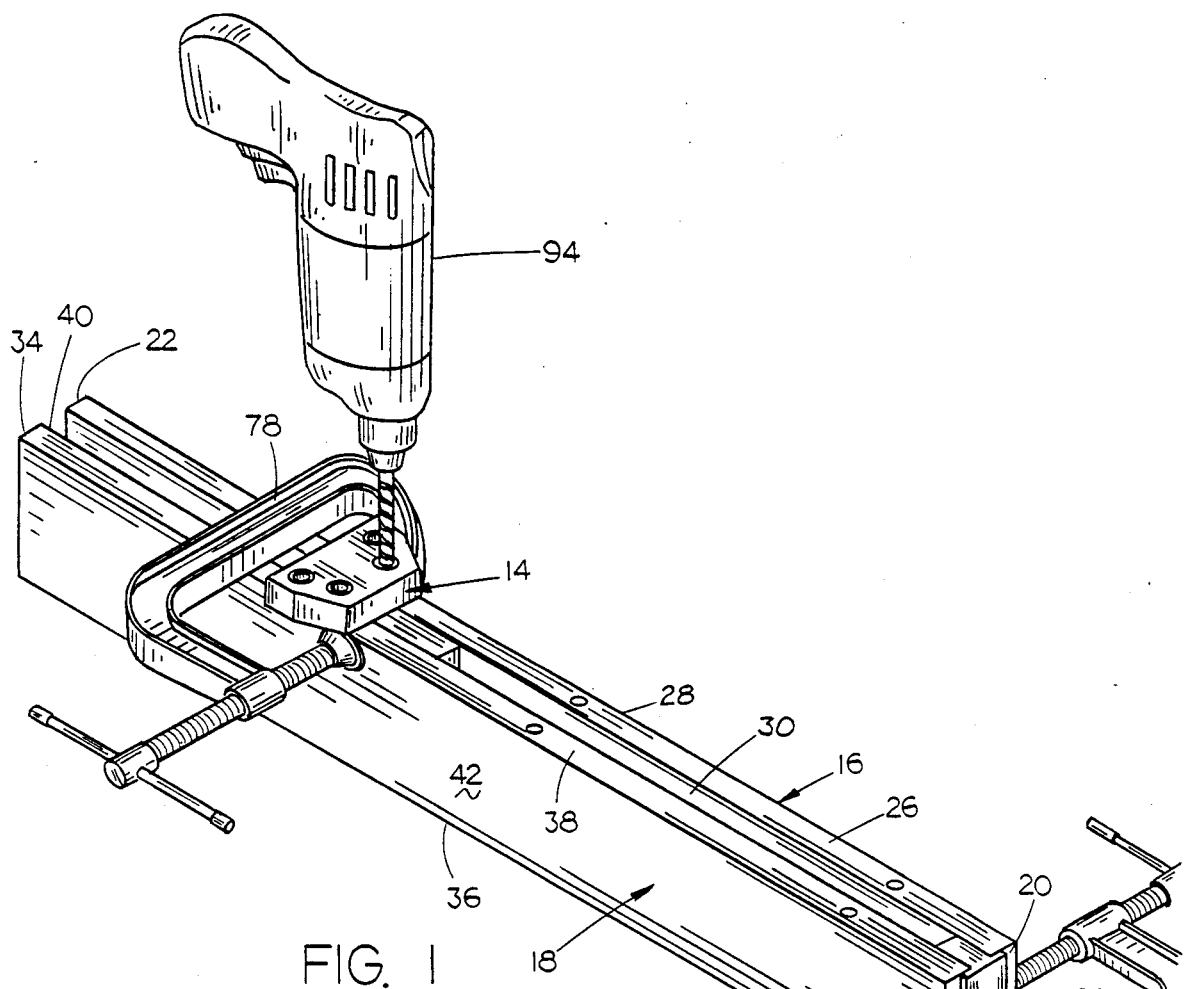
FIG. 1 is a perspective view of the edge joining fixture of this invention being employed.
Figure 2:
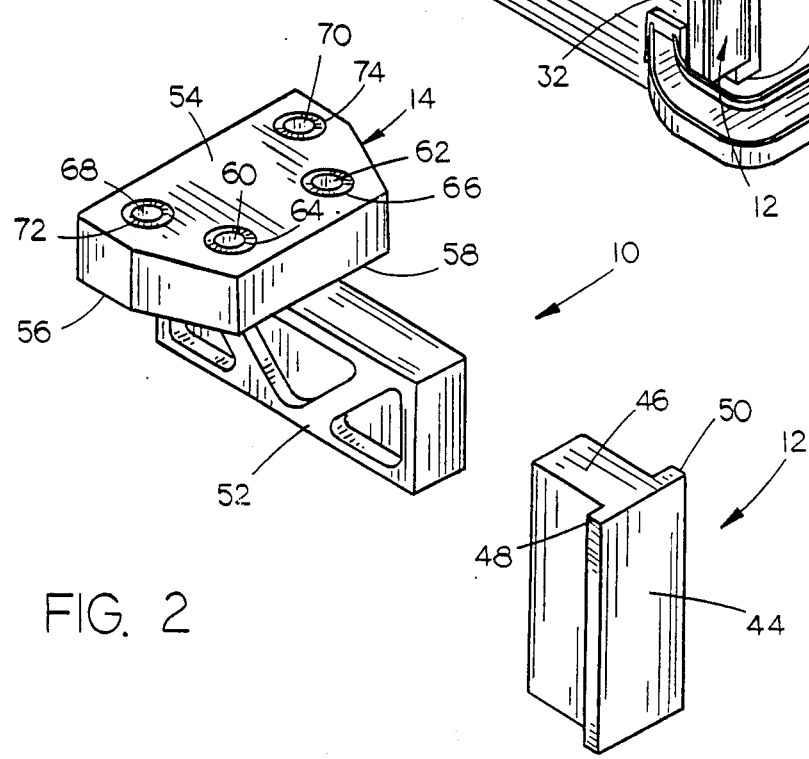
FIG. 2 is a perspective view of the two components of the edge joining fixture of this invention.
Figure 3:
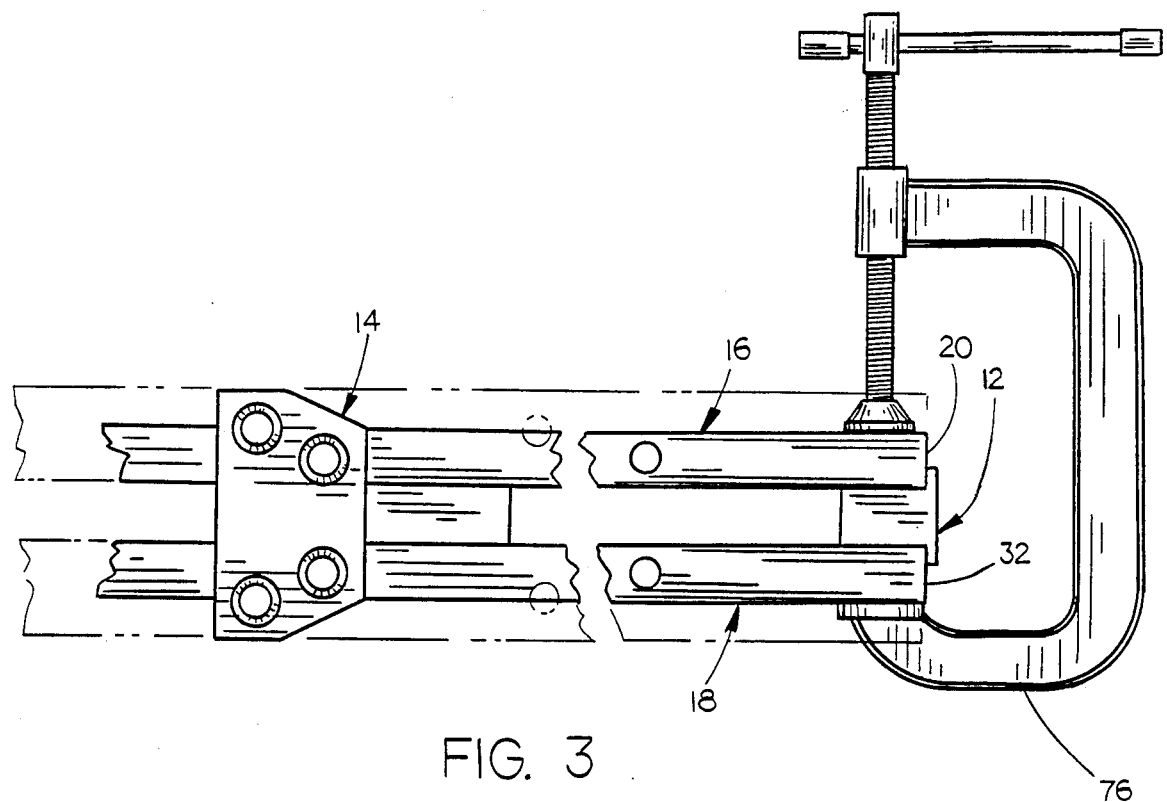
FIG. 3 is a partial top view illustrating the apparatus of this invention being employed.
Figure 4:
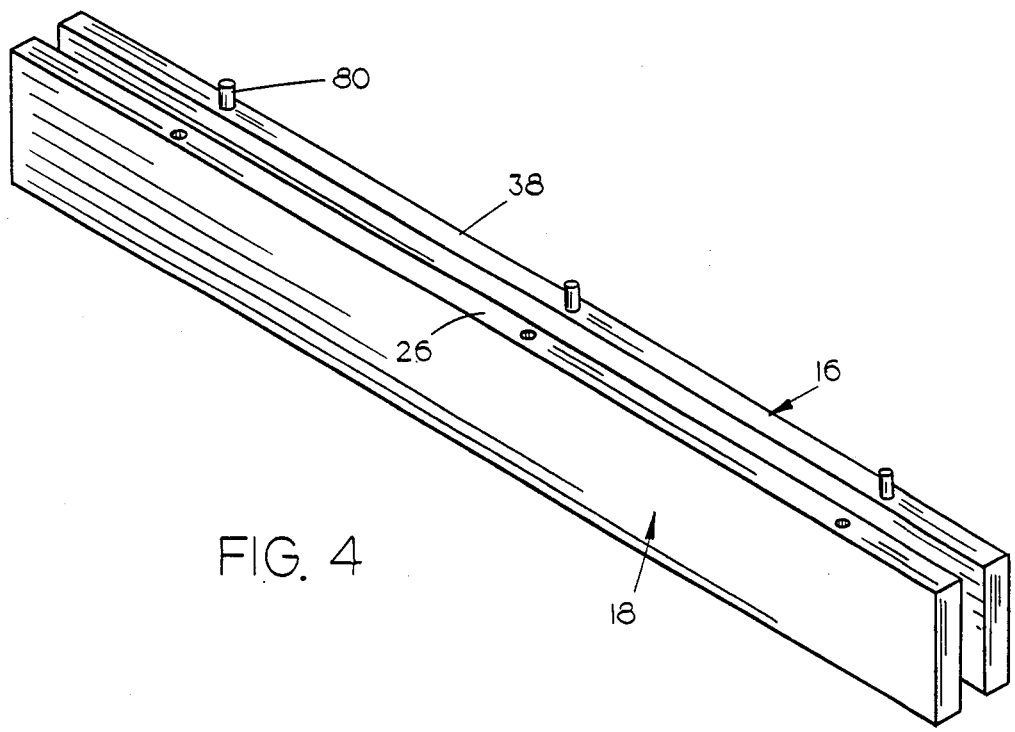
FIG. 4 is a perspective view illustrating the manner in which the edges may be joined after the fixture has been used to drill dowel holes in a pair of boards.

An edge joining fixture is provided for accurately locating dowel holes in the edges of two or more boards that are to be glued edge-to-edge. The edges of the boards to be glued together are first prepared by planing to ensure that the edges are straight and at right angles to the faces of the boards. Two boards which are to be clamped together are positioned so that they are parallel with the edges to be glued pointing up. A spacer is positioned between the boards at one end thereof with the ends of the boards abutting a flange on the spacer. The spacer is clamped between the boards by C-clamps or the like. The clamp maintaining the spacer in position is not released until all of the dowel holes have been drilled.

A body member is then positioned between the boards at the desired dowel hole location with a portion of the body member extending over the upper edges of both of the boards. The body member is provided with drill bushings precisely positioned therein so that the drill bushings will be located over the edges of both boards. The body member is then clamped into position and a rotatable drill bit is then moved downwardly through the drill bushings to create the dowel holes in the edges of both boards. When the dowel holes have been drilled, the clamps maintaining the body member in position are released and the body member is moved to the next position where dowel holes are to be drilled. The procedure is repeated until all of the necessary dowel holes have been drilled.

When all of the dowel holes have been drilled, dowels are inserted into the holes in one of the boards with the joint being completed by applying glue to the edges clamping the same together with cabinet makers clamps or other suitable clamping devices.

It has also been found that the fixture of this invention may be used to create miter joints.

DESCRIPTION OF THE PREFERRED EMBODIMENT

The edge joining fixture of this invention is referred to generally by the reference numeral 10 and is comprised of a spacer 12 and a body member 14. For purposes of description, the numerals 16 and 18 refer to a pair of board members which are to be joined together in an edge-to-edge relationship. For purposes of description, board 16 will be described as including opposite ends 20 and 22, opposite edges 24 and 26, and opposing surfaces 28 and 30. Board 18 includes opposite ends 32 and 34, opposite edges 36 and 38, and opposing surfaces 40 and 42. During the description of the operation of the fixture of this invention, it should be noted that it is the edges 26 and 38 that are to be joined together.

Spacer 12 is comprised of an elongated, generally T-shaped member including a base portion 44 having a leg portion 46 extending therefrom. As seen in the drawings, the width of leg portion 46 is less than the width of the base portion 44 to create shoulders or flanges 48 and 50 at opposite sides of leg portion 46.

Body member 14 includes an elongated leg portion or block portion 52 having a thickness or width identical to that leg portion 46 of spacer 12. Base portion or plate 54 is positioned at the upper end of leg portion 52 and dwells in a plane transverse that of leg portion 52 to define shoulders or flanges 56 and 58 on the underside of base portion 54

Base portion 54 is provided with a pair of openings 60 and 62 positioned on opposite sides of leg portion 52 and have hardened steel bushings 64 and 66 press-fit thereinto. The bore in the bushings 64 and 66 may be of any diameter although the diameter would normally be either ¼ inch or ⅜ inch to accommodate ¼ inch or ⅜ inch diameter drill bits. Openings 60 and 62 are spaced apart in a predetermined manner so that it is possible to drill holes in the center of the edges of material having a ¾ inch thickness.

A second set of openings 68 and 70 having bushings 72 and 74 positioned therein respectively are also provided and are spaced farther apart than openings 60 and 62 to accommodate material which is 1-½ inches thick.

The fixture of this invention is used to join edges as follows. The edges of the boards 16 and 18 would first be prepared by planning to ensure that the edges are straight and at right angle to the faces or surfaces of the boards. Boards 16 and 18 are positioned as illustrated in FIG. 1 so that the edges 26 and 38 are pointing upwardly. Spacer 12 is positioned between the ends 20 and 32 of boards 16 and 18 so that the ends of the boards abut flanges 48 and 50. One or more C-clamps 76 are utilized to clamp the boards to the spacer 12.

Body member 14 is then positioned for the first set of holes and is placed between the boards and clamped as illustrated in the drawings so that flanges 56 and 58 rest on the upper edges of the boards. One or more C-clamps 78 are than utilized to clamp the boards to the body member 14. Using the hardened steel bushings as a guide, a hole is drilled into the edge of each board utilizing either the bushings 64–66 or the bushings 72–74 depending on the thickness of the boards. The depth of the holes created in the edge of the boards is not critical but should be sufficient to accommodate one-half the length of the dowel being used, usually 1.5–2 inches long (plus 1/16 to ⅛ inch).

Without releasing the clamp 76 holding the spacer 12, the clamp 78 holding the body member 14 is released and the body member 14 is moved into the next position for the second set of holes. The clamp 78 is then tightened and the holes drilled. The remaining sets of holes are drilled repeating the steps just described with the number of sets and the spacing being at the discretion of the user.

When all sets of the holes have been drilled, clamps 76 and 78, spacer 12 and the body member 14 are removed. Dowels 80 are then inserted into the holes in the boards. The joint is completed by applying glue to the edges 26 and 38, reassembling and clamping the boards with cabinet maker's clamps or other suitable clamping devices.

The spacer 12 and body member 14 may be constructed of sand cast aluminum or any other suitable material such as die cast aluminum, die cast zinc, cast iron, injection molded plastic, fiberglass, reinforced plastic resin, machined and assembled flat metal stock, machined and assembled flat plastic or wood.

It can therefore be seen that a novel edge joining fixture has been provided which permits the user of the fixture to accurately locate holes in the edges of two or more boards of any width or length that are to be glued edge-to-edge. The fixture of this invention enables the glued joint holding the boards together to be reinforced. The fixture of this invention also ensures that the dowel holes will be formed in such a manner so that the faces of the boards will be accurately aligned so that only a minimum amount of material must be removed from the face to provide a smooth and uninterrupted surface.

Figure 5:
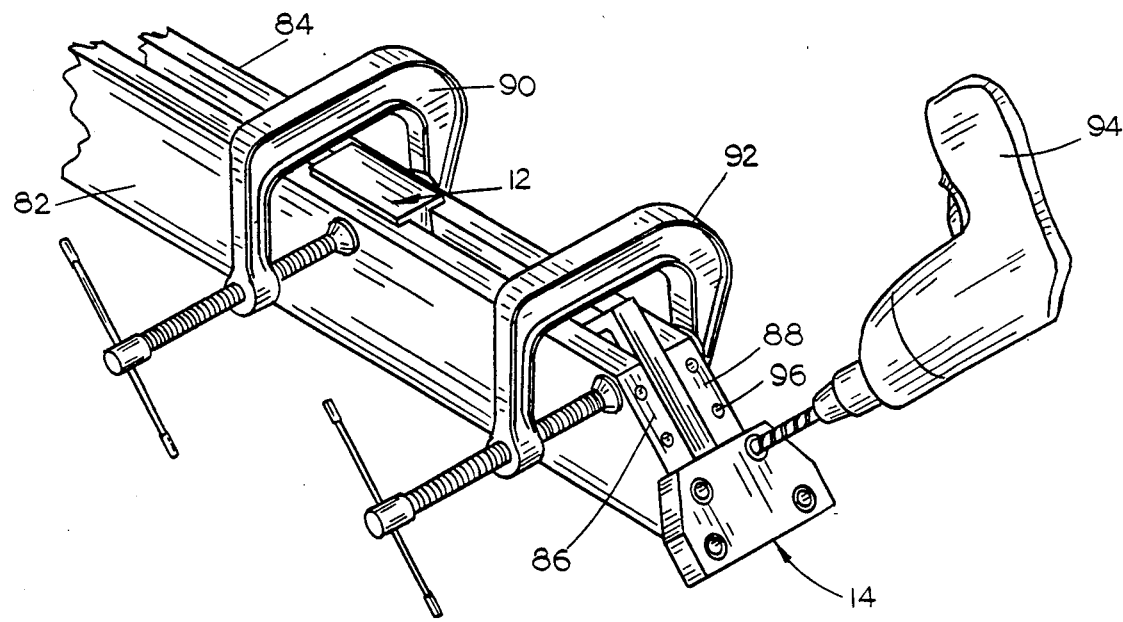
FIG. 5 is a perspective view illustrating the device of this invention being used to create dowel openings in the ends of a pair of boards which will be used to create a miter joint.
Figure 6:
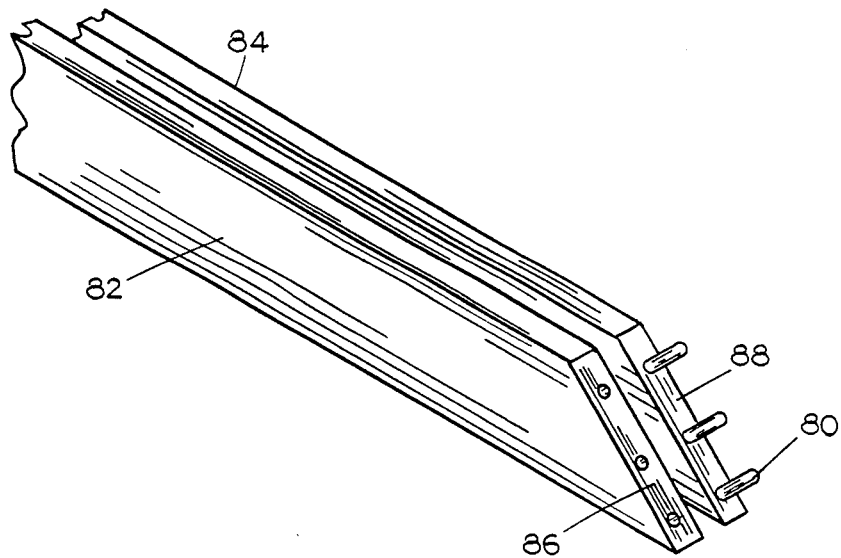
FIG. 6 is perspective view illustrating the boards of FIG. 5 after the dowel holes have been created and the dowels inserted in the dowel holes in one board.

It has also been discovered that the fixture of this invention may be used to create miter joints in square or rectangular picture frames and the same is illustrated in FIGS. 5 and 6. In FIGS. 5 and 6, the numerals 82 and 84 refer to the two boards which will be used to create a miter joint. As seen in FIG. 5, the ends of the boards 82 and 84 have been cut at an angle to create angular end portions 86 and 88. Body member 14 is positioned with respect to the boards 82 and 84 as illustrated in FIG. 5 so that the ends 86 and 88 engage the underside or flanges 56 and 58 of the body member. Spacer member 12 is then inserted between the boards 82 and 84 and the clamp 90 tightened. When body member 14 has been properly positioned relative to the ends 86 and 88, clamp 92 is tightened. Drill 94 is then used to create dowel holes 96 in the ends 86 and 88. When a pair of the dowel holes 96 have been created, clamp 92 is released and the body member 14 moved relative to ends 86 and 88 so that another pair of dowel holes 96 may be drilled. When the desired number of dowel holes have been drilled in th ends 86 and 88, clamps 90 and 92, spacer 12 and body member 14 are removed.

After all of the desired dowel holes have been drilled, glue is applied to the mating surfaces 86 and 88, dowels are inserted in the dowel holes and the joint assembled and clamped.

Thus it can be seen that the invention accomplishes at least all of its stated objectives.

I claim:

1. An edge joining fixture for facilitating the drilling of dowel holes in the edges of a pair of board members which will be subsequently secured together, each of the board members being oriented during the drilling operation so as to define upper and lower edges, first and second ends, and spaced-apart faces, comprising, a T-shaped spacer comprising a vertically disposed base portion having inner and outer ends, and a leg portion extending inwardly from the inner end of said base portion, said leg portion of said spacer being positioned between the pair of board members which are to be joined together with the ends of one of the faces of each of the board members being positioned adjacent opposite sides of said leg portion and said one end of each of the board members being in engagement with the inner end of said base portion, means positioning and holding said spacer between said board members during the drilling operation, a selectively movable body member comprising a vertically disposed leg portion adapted to be positioned between a pair of board members, said leg portion of said body member having the same thickness as said leg portion of said spacer, and a horizontally disposed top portion extending laterally outwardly from the upper end of said leg portion of said body member over said board members, said top portion having at least first and second, spaced-apart openings formed therein extending downwardly therethrough, said openings being spaced apart a predetermined distance, relative to said leg portion, whereby a drill means may be rotatably extended downwardly therethrough to drill aligned dowel holes in the upper edges of said board members, and clamping means for selectively holding said body member in a fixed position relative to said board members during the drilling of the two dowel holes, said clamping means being selectively releaseable to permit said body member to be moved along the upper edges of the board members for subsequent drilling operations.

2. The fixture of claim 1 wherein third and fourth openings are formed in said top portion, said third and fourth openings being positioned laterally outwardly of said first and second openings respectively to permit the fixture to accommodate board members having a thickness greater than the thickness of said pair of board members.

3. A fixture for facilitating the drilling of dowel holes in the angled ends of a pair of board members which will be subsequently secured together, each of the board members being oriented during the drilling operation so that the angled ends are aligned, comprising, a T-shaped spacer comprising a horizontally disposed base portion having upper and lower ends, and a leg portion extending downwardly from the lower end of said base portion, said leg portion of said spacer being positioned between the pair of board members, means positioning and holding said spacer between said board members during the drilling operation, a selectively movable body member comprising a first portion adapted to be positioned between the pair of board members, said leg portion of said body member having the same thickness as said leg portion of said spacer, and a second portion extending laterally outwardly from the end of said leg portion of said body member over the ends of said board members, said second portion having at least first and second, spaced-apart openings formed therein extending therethrough, said openings being spaced apart a predetermined distance, relative to said leg portion, whereby a drill means may be rotatably extended therethrough to drill aligned dowel holes in the angled ends of said board members, and clamping means for selectively holding said body member in a fixed position relative to said angled ends during the drilling of the two dowel holes, said clamping means being selectively releasable to permit said body member to be moved along the angled ends of the board members for subsequent drilling operations.

* * * * *